Feb. 14, 1950
F. E. DAVIS
2,497,155
ROTARY SHEAR
Filed Oct. 2, 1945
2 Sheets-Sheet 1
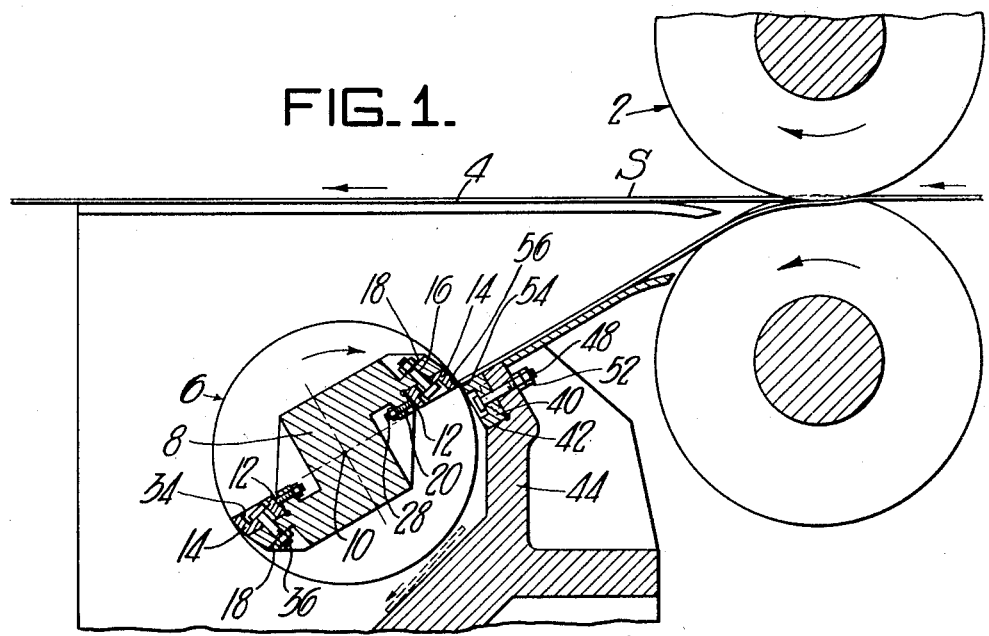
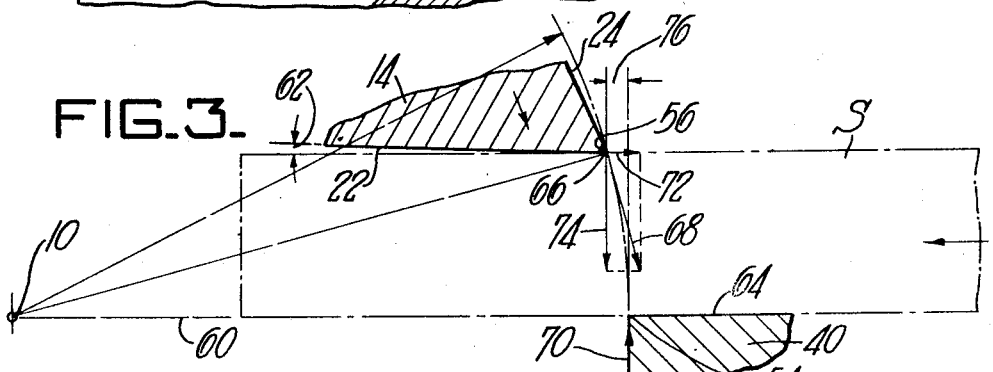
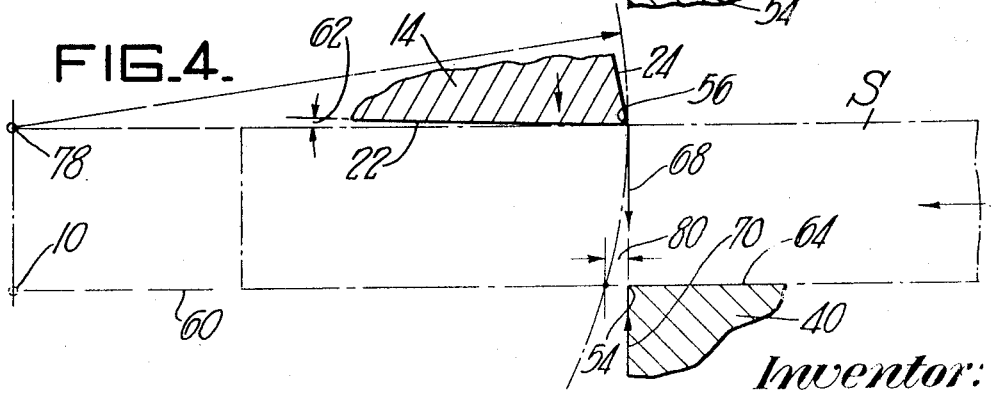
Inventor:
FLOYD E. DAVIS,
by: Donald G. Dalto
his Attorney Feb. 14, 1950 F. E. DAVIS 2,497,155
ROTARY SHEAR
Filed Oct. 2, 1945 2 Sheets-Sheet 2

Inventor:
FLOYD E. DAVIS,
Donald G. Dalton
his Attorney.

Patented Feb. 14, 1950

2,497,155

UNITED STATES PATENT OFFICE 2,497,155

ROTARY SHEAR

Floyd E. Davis, Gary, Ind.

Application October 2, 1945, Serial No. 619,817

1 Claim. (Cl. 164—10.6)

This invention relates to a rotary shear and more particularly to a shear for use in chopping up defective sheets or for removing the defective parts of sheets, after which the remaining good part of the sheet is continued along the pass line to the next step of the process. In operation of the line, if a defect is discovered in the sheet the end of the sheet is directed down to the shear after it passes through a trimmer and after the defects have been removed, the remaining good part of the strip is directed into the pass line to the next processing step. The shear has a rotary knife and a stationary knife with the face of the rotary knife traveling ahead of the cutting edge of the knife and the face of the stationary knife in front of the cutting edge with reference to a straight line through the center of rotation of the rotary knife and the cutting edges of the knives. This condition causes the chipping off of the cutting edges of the knives which is eliminated by my invention. The knives in present use also have the disadvantage that they cannnot be used successfully after sharpening, since they are not adjustable.

It is an object of my invention to provide a rotary shear in which the cutting edges of the knives are protected from excessive chipping.

Another object is to provide a rotary shear having adjustable knives.

These and other objects will be more apparent after referring to the following specification and attached drawings, in which:

Figure 1 is a cross sectional view of the shear showing its relationship to the trimmer;

Figure 3 is a vector analysis of the action of the shear on the strip; and

Figure 4 is a view similar to Figure 3 showing a modification of my invention.

Figure 2:
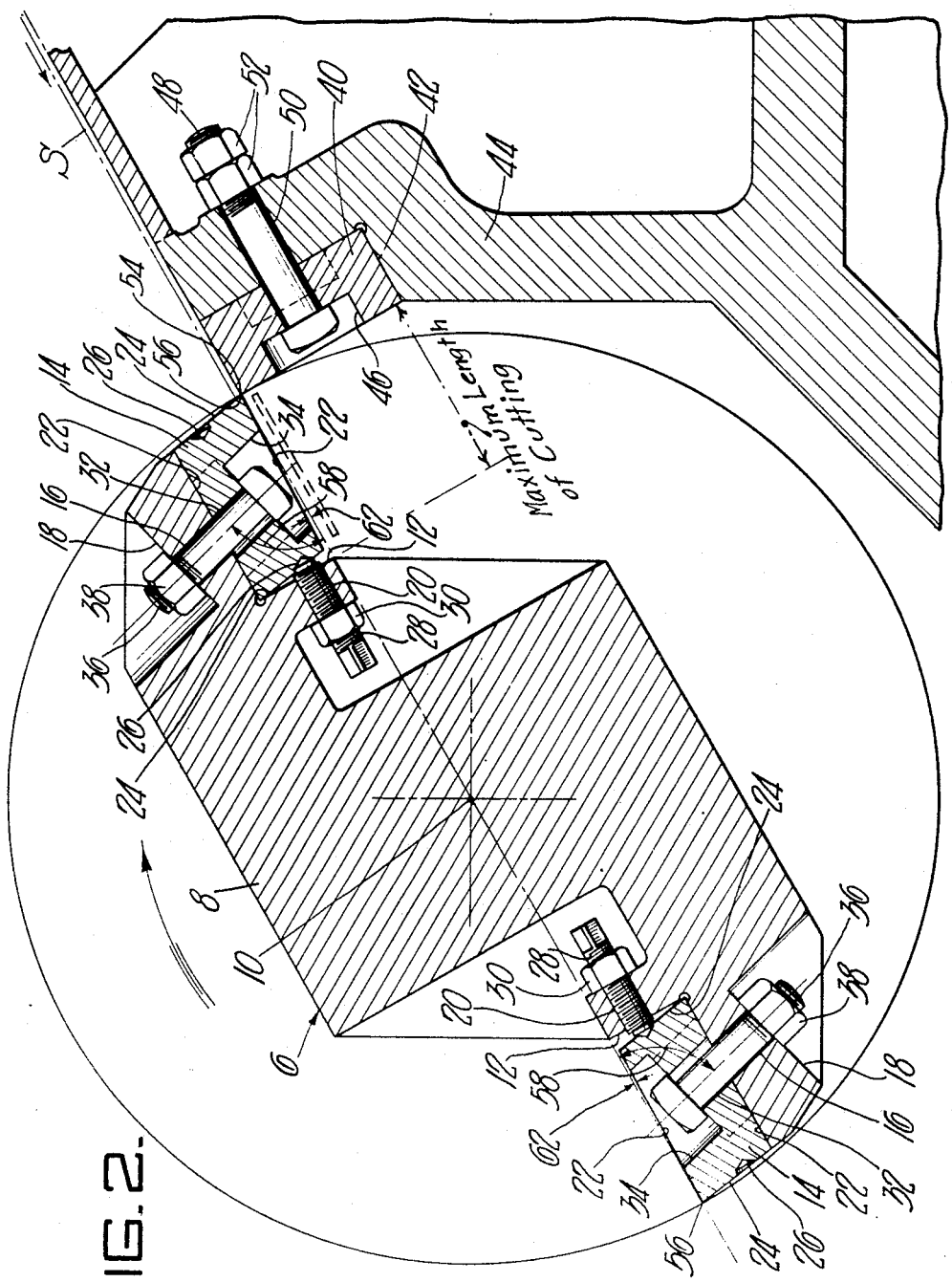
Figure 2 is an enlarged cross sectional view of the shear of Figure 1.

Referring more particularly to the drawings, the reference numeral 2 indicates a trimmer for trimming the edges of steel strips. The good strip passes from the trimmer along the pass line 4 toward the next operation in the strip processing line. The defective metal trimmed from the sheet is directed downwardly to the rotary shear 6 where it is sheared into small pieces. If a defect is discovered in the leading edge of the strip it is directed downwardly in the same manner and the defect removed by the shear, after which the strip is again directed into the pass line 4. The shear 6 has a rotary knife holder 8 which rotates about its axis 10. On the outer portion of the holder 8 on each side thereof is a recess 12 for receiving a knife 14. Communicating with the recess 12 is a hole 16 which terminates at the surface 18 which is normal to the axis of the hole 16. A threaded opening 20 extends from the recess 12 in the general direction towards the axis 10. The knife 14 has the shape of a parallelogram with the long sides 22 forming an acute angle with the short sides 24 at the cutting edge. The short side 24 nearest the axis 10 is provided with a conical opening 26 for receiving set screw 28 which is screwed into opening 20 to adjust the position of the knife 14. The screw 28 is provided with a lock nut 30 for holding it in adjusted position. The knife 14 has a counterbored opening 32 extending therethrough. The bore of the opening 32 is oval shaped with its shorter dimension being approximately equal to the diameter of hole 16. The counterbored portion 34 is of sufficient depth to receive the head of a bolt 36 which extends through openings 16 and 32 and is held in place by means of a nut 38 which bears against surface 18. Counterbored portion 34 is wide enough to receive the square head of the bolt 36 but will not permit it to turn about its center line. The knife 14 may be made reversible by having similar openings 26 and 32 in the other two sides thereof. Located outside of the line of travel of the rotary knife 14 is a stationary knife 40 which is received in a recess 42 in a knife holder 44. The knife 40 is rectangular in shape and is provided with an opening 46 which is shaped like counterbore 34. The head of a bolt 48 is received in this opening 46 and extends through an opening 50 in the holder 44. Similar opening 46 may be provided in the opposite side of the cutter 40 in order to make the knife reversible.

In operation, the knife 40 is placed in the recess 42 and held in position therein by means of the bolt 48 which extends through openings 50. Nuts 52 lock the knife in the desired position with its cutting edge 54 adjacent the line of travel of the cutting edge 56 of the rotary knife 14 with a slight clearance between the cutting edges 54 and 56. A knife 14 is placed in each of the recesses 12 and held in place by means of bolt 36. The set screw 28 adjusts the knife 14 until its cutting edge 56 is in the desired position, after which the nut 38 is tightened to hold the knife in adjusted position. The angle 58 formed by the center line of the bolt 36 and a line 60 which passes through the axis of the rotary knife holder and the cutting edge 56 is less than 90°, whereby the bolt holds the knife 14 firmly against the set screw 28. The face 22 of the knife 14 extends from the cutting edge 56 away from the direction of rotation of the knife 14 and forms a clearance angle 62 with line 60. With this construction, the cutting edge 56 always travels ahead of the face 22 so that the cutting edge will be the first part of the cutter to contact the sheet S being sheared. The face 64 of the stationary knife 40 is shown on the line 60 which extends toward the center of rotation 10. The sheet S is fed to the shear on the line 60 and is sheared between knife edges 54 and 56 as the rotary knife holder 8 rotates.

Figure 3 shows a vector analysis of the shearing action on the strip S when the rotating blade is centered at 10 as shown in Figure 1. When the cutting edge 56 contacts the strip S at point 66, it strikes with a tangential force 68 which is not normal to the top surface of the strip. This force is divided into the normal shearing force 74 and a pushing force 72. Resisting the force 74 is an equal and opposite force 70 which passes through the cutting edge 54. The forces or vectors 70 and 74 form a couple which are separated by a distance 76 at the beginning of the shearing action. Due to the clearance between cutting edges 54 and 56, the distance 76 will be slightly greater than that shown. The couple is maximum at the beginning of shearing and decreases as the knife blade passes through the sheet S. With this construction, there is very little danger of the knife edge 56 being broken off.

Figure 4 is a view similar to Figure 3 but shows the center of rotation at point 78 which is on the line of the top surface of the strip S instead of on the bottom surface. In this arrangement, the cutting edge 56 strikes the top surface of the strip S normally and therefore there is no dividing of the force 68 which functions entirely in shear. As cutting edge 56 passes through the strip S it swings away from the cutting edge 54 to provide clearance 80. The couple between forces 68 and 70 is minimum at the beginning of the shearing action and increases as the shearing action progresses.

It will be seen from a study of Figures 3 and 4 that the face 64 of the stationary knife need not be exactly on a line extending toward the center of rotation on the rotary knife but that some leeway is possible, it only being necessary that the face be on a line extending substantially toward the center of rotation.

While two embodiments of my invention have been shown and described, it will be apparent that other adaptations and modifications may be made without departing from the scope of the following claim.

I claim:

A rotary shear for metallic sheets or the like comprising a rotary knife holder, a knife, said holder having a recess adjacent its outer end for adjustably receiving the knife, said knife having a counterbored opening therethrough extending away from the direction of rotation of the holder, said holder having an opening therein in line with the opening in the knife, a cutting edge at the outer end of the face of the knife, one face of said knife extending from the cutting edge away from the direction of rotation of the knife and forming an angle with a radial line through the cutting edge so that the cutting edge travels ahead of the face of the knife, the outer face of said knife being cut back from the cutting edge so that the maximum radius is at the cutting edge, said holder having a threaded opening therein extending into said recess from the center of the holder, a screw in said threaded opening for moving the knife relative to the center of the holder, a bolt extending through said first and second openings to hold the knife in adjusted position the angle formed by the centerline of the bolt and a line passing through the axis of the rotating knife holder and the cutting edge being substantially less than 90°, a stationary knife located outside the line of travel of said rotary knife and having a face substantially on a radial line extending from the axis of rotation of the rotating knife holder, a cutting edge on said stationary knife adjacent the path of travel of the cutting edge of the rotary knife and means for feeding the sheet to the shear on a line extending substantially toward the center of rotation of the rotary knife and substantially parallel to the said face of the stationary knife.

FLOYD E. DAVIS.

REFERENCES CITED

The following references are of record in the file of this patent:

UNITED STATES PATENTS

| Number | Name | Date |
|---|---|---|
| 1,182,416 | Overbury | May 9, 1916 |
| 1,352,154 | Speer | Sept. 7, 1920 |
| 1,380,710 | Goben | June 7, 1921 |
| 2,037,330 | Jackson | Apr. 14, 1936 |
| 2,242,887 | Holdgate et al. | May 20, 1941 |
| 2,298,221 | McLaughlin | Oct. 6, 1942 |

FOREIGN PATENTS

| Number | Country | Date |
|---|---|---|
| 471,940 | Great Britain | Sept. 14, 1947 |